Figure 1:
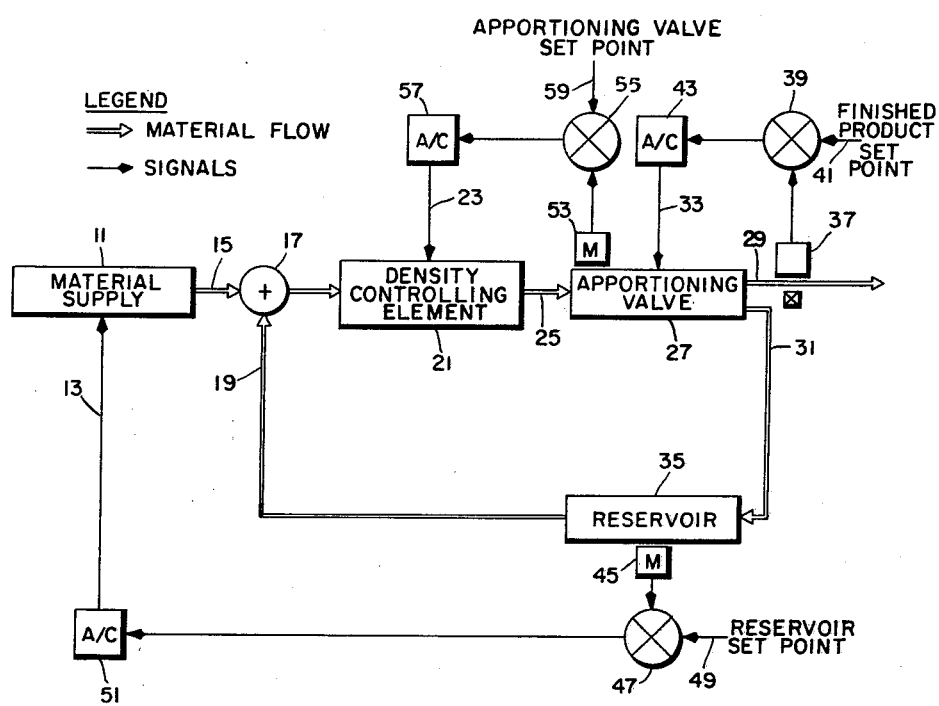

INVENTOR
Victor S. Levadi

Sept. 4, 1962 V. S. LEVADI 3,052,242
CONTROL SYSTEM
Filed Aug. 15, 1960 2 Sheets-Sheet 2

INVENTOR
Victor S. Levadi
by Anthony D. Cennamo

United States Patent Office 3,052,242
Patented Sept. 4, 1962

1

3,052,242
CONTROL SYSTEM
Victor S. Levadi, Columbus, Ohio, assignor to Industrial Nucleonics Corporation, a corporation of Ohio
Filed Aug. 15, 1960, Ser. No. 49,722
13 Claims. (Cl. 131—21)

This invention relates generally to method and apparatus control systems for industrial processes and more particularly to multiple loop control systems wherein the multiple control loops are interdependent and operate to provide substantially instantaneous as well as average control of the quality of an output product thereby to provide a system capable of substantially completely automatic operation while producing an extremely uniform high quality product.

Control systems having been provided in the past which measure a manufactured product and control the average rate of flow of material from which the product is formed thereby providing excellent average control when the system is operating under ideal conditions. Systems of this type suffer from the disadvantage, however, that short term variations in the product cannot be compensated since the control signal is applied at the source of the material and hence the control loop encompasses all of the time lags in the system including the time delays in transmitting signals through the loop, the time lag involved in the ultimate controller device responding to the control signal and the process transportation lag between the point at which the process is controlled and the point at which the signal is measured from the product. It is well known in control systems of this type that the limiting speed of fluctuations which can be controlled is determined by the total time lag in the control loop.

In the co-pending application of Walker B. Lowman, Serial No. 34,748, filed June 8, 1960, assigned to the assignee in the present application, a novel control system is disclosed which provides two interdependent control loops for the control of a continuous manufacturing process. The material flow from the material supply source in this Lowman application is controlled to supply the average value of material required to produce the finished product and hence over a time average supplies the exact quantity of material utilized in the process which is to be converted into the finished product. In order to equalize short term variations in the flow of material in the process, means are provided near the final station in the process where material can be added or removed to supply deficiencies or remove excess quantities of material received from the average controlled source. The final product output is measured and the control signal derived therefrom is applied to the nearby control station wherein small short term variations in the quantity of material going into the product are adjusted with a short time lag in the control loop and a short transportation lag between the adjusting station and the point at which the product is measured. This novel two loop control system provides excellent results under normal conditions as long as the slow and fast control loops are operating within the desired operating range and are capable of accommodating the variations present in material flow in response to the respective signals in the two control loops.

While two control loop process control systems such as that disclosed in the aforementioned Lowman application provide excellent results under ideal operating conditions they require day-to-day attention to assure that the control devices operate within their normal operating range and are not driven into a saturation condition as a result of some abnormal condition in the process where no desired control action can be effected. The present invention is directed to systems which utilize a plurality of control loops in controlling a continuous industrial process in which the control action operates to provide accurate average and short term control of the product and in addition provides control of the operating range of the controllers thereby to make the control system capable of accommodating abnormal conditions in the material process. With the availability of a multiplicity of control loops it is also possible under certain conditions to use less than the total number of such loops to provide satisfactory control in a plural loop control system where the number of loops is less than the total number available in the herein disclosed embodiments.

It is accordingly the primary object of the present invention to provide multiple interdependent loop control methods and systems for industrial processes which are capable of completely automatic manufacture of highly uniform high quality product.

A further object of this invention is to provide a control system having average control of material flow, short term control of the quantity of material going into a product and additional control to make certain that the high speed control system operates always within a satisfactory operating range of the device being used.

A further object of the invention is to provide a three control loop method and system for processing tobacco in a cigarette making machine in which the average flow of tobacco corresponds exactly with the average tobacco weight in the output cigarette rod and in which short term variations are removed by a fast acting control loop which is maintained in its linear range of operation for all tobacco conditions.

A further object of the invention is to provide dual loop control systems for a tobacco making machine having improved characteristics.

A still further object of the invention is to provide a three loop control system for an industrial process in which material is supplied at the exact average value required for the finished product and a reservoir of material is maintained near the point where the finished product is formed for the purpose of supplying short term variations in the quantity of material going into the product and with a fast acting control loop operating in conjunction with the reservoir control loop to produce completely automatic control of a high quality product.

Figure 2:
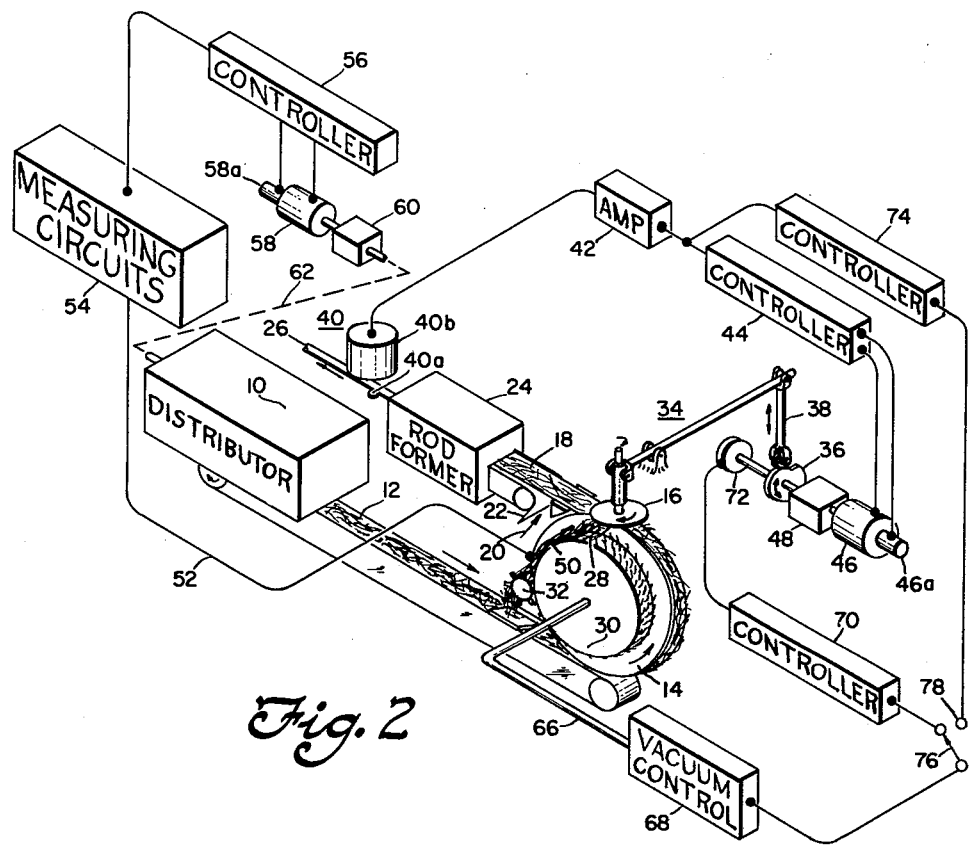

These and other objects of the invention will be apparent from the following detailed description taken in conjunction with the accompanying drawings wherein:

FIG. 1 is a block diagram of a generalized continuous industrial process with three interdependent control loops; and FIG. 2 is a representation of a cigarette making machine under the control of three interdependent control loops.

Referring now to FIG. 1 a system in accordance with the invention comprises a material supply source 11 which is controllable by a control signal on line 13 to supply an adjustable amount of material for the process on output conveyer path 15. The material flowing in path 15 is supplied to a combining device 17 where it is combined with material supplied to the device 17 over a path 19. The output of the combining device 17 supplies the total mass of material received on paths 15 and 19 to a density controlling element 21 where the material is subject to density control in accordance with signals on a line 23. The material with controlled density flows over a path 25 to a volumetric apportioning device 27 wherein the total volume flow from the line 25 is divided between two output paths 29 and 31 in accordance with a signal on line 33. The volumetric flow into path 31 is supplied to a reservoir 35 from which flows in the path 19 for equilibrium conditions a mass flow equal to that supplied from the line 31 to the reservoir 35.

For the control of the process of FIG. 1 a plurality of control loops are provided. One control loop comprises a measuring device 37 for measuring the mass per unit time of the material flowing in the path 29 which may be the output product of the process. The signal derived by the measuring device 37 is applied to a set point selecting means 39 which has an input 41 for selecting the desired mass target point for the product in line 29. The difference between the signals supplied to set point device 39 produces an error signal to an automatic controller 43 which is adapted to supply the proper signal on line 33 for controlling the apportioning valve 27.

A second control loop is provided for controlling the material supply device 11. For this purpose a metering device 45 is arranged to measure the quantity of material in the reservoir 35 and supply a signal to a reservoir set point device 47 which has a reservoir set point input signal provided on input 49. The difference between the input from metering device 45 and the setting on input 49 produces an error signal from the output of the reservoir set point means 47 which is applied to an automatic controller 51 for producing a suitable signal on the lead 13 for controlling the supply of material from the material supply device 11, thus controlling the amount of material flowing in the path 15.

A third control loop is provided which is responsive to the volumetric adjustment of the apportioning valve 27. For this purpose a measuring head 53 is arranged to measure the adjustment of the apportioning valve 27 thereby being a measure of the volumetric flow in the line 29 at the output of the valve 27. This signal from the measuring device 53 is applied to an apportioning valve set point means 55 which has a selectable set point input 59. Set point means 55 produces an error signal to an automatic controller 57 which provides a control signal on line 23 suitable for controlling the density controlling element 21.

The operation of the system of FIG. 1 to produce a uniform product under automatic control will now be described. The product emanating in path 29 is measured by the measuring device 37 to produce a signal which is compared in set point device 39 with the desired product property established by the input adjustment 41. The set point device 39 produces an error signal to the controller 43 which operates the apportioning device 27 for apportioning a greater or lesser volume to the output line 29 as required by deviations from the product target weight per unit length established by setting 41. Under normal conditions the apportioning valve 27 maintains the proper flow in the path 29 to produce the desired weight of the product. The apportioning valve 27 normally diverts a portion of the volumetric flow from line 25 to the output path 31 which supplies the reservoir 35. This flow is returned through the path 19 to the combining device 17 and either the time integral of the rate of flow or the level of material in reservoir 35 may be sensed by the metering device 45. The reservoir 35 is therefore maintained at a predetermined level as determined by the setting of input 49 of reservoir set point device 47 and variations in this level as a result of variations in the rate of flow therethrough result in a signal to the controller 51 to adjust the rate of material supply from the source of material supply 11. Thus an adjustment of apportioning valve 27 to reduce the quantity of material in path 29 results in an increased quantity of material in the path 31 thereby raising the level in reservoir 35 and producing the signal to reduce the material supplied from source 11 which ultimately results in readjustment of the apportioning valve 27 to the normal volumetric position between lines 29 and 31.

The operation of the third control may be illustrated from a consideration of the conditions which obtain whenever the apportioning valve 27 is adjusted near the end of its operating range. Assume that conditions exist such that the apportioning valve 27 is adjusted by the signal 33 to the position for maximum volumetric flow, this flow being called for by the comparison in device 39 of requirements for the product and the actual measurement signal of the product produced by the measuring device 37. Since the apportioning valve 27 can no longer supply increased volumetric flow the signal derived by the measuring device 37 for the greater mass flow will be unsatisfied unless the density controller 21 is brought into operation. This element 21 operates in response to signals on line 23 to increase the density of the material flowing in path 25 whenever the measuring device 53 senses that the apportioning valve 27 is adjusted to a position for greater than normal volumetric flow. Thus under conditions when the valve 27 is calling for maximum volume flow the measuring device 53 will increase the density of the product in line 25 by adjusting the density controlling element 21. Hence the output of the apportioning valve 27 will have a greater mass flow due to the higher density of the input material and for greater mass flow the measuring device 37 will detect a signal indicating that the volumetric flow from valve 27 can be reduced. Thus if the apportioning valve set point input to the device 55 is established to maintain the apportioning valve 27 approximately at the midpoint of its operating range variations of the valve position therefrom will result in corrective density signals to the density controlling element 21. This adjustment of the density of material flow in the line 25 tends to keep the apportioning valve 27 at the mid-point of its operating range where response is linear and the available excursion is adequate for any short term requirements of the product due to short term deviation in the actual mass flow in the path 29.

With the arrangement of FIG. 1 the actual operation of a continuous process can be carried on with widely varying characteristics of the supply material obtained from the material supply device 11. The average mass flow in the path 15 will be maintained exactly equal to the average mass flow of the finished product in the path 29 by the action of the servo loop which controls the material supply device 11. The rapid variations in the mass of the product which unavoidably occur will be eliminated by the rapid action of the servo loop operation from measuring device 37. The result of the operation of the apportioning valve in this control loop produces a corresponding density adjustment which maintains the apportioning valve 27 in its best position for control purposes. In addition should the material supply density vary drastically in a manner that would not permit the apportioning valve 27 to produce the proper mass flow by adjustment of the volumetric flow then the density controlling element 21 will be effective to adjust the entire system for the changed density material flowing in line 15 from the supply source.

Referring now to FIG. 2 the invention will be described as applied to a specific embodiment of a cigarette rod manufacturing process. Certain of the elements in FIG. 2 correspond with those disclosed in the aforementioned application of Lowman and accordingly will not be described in detail herein.

FIG. 2 is a simplified schematic showing of a specific type of cigarette making machine, for example, a machine such as the "Garant" Twin Rod Spiral Machine which is manufactured by Hauni Werke Korber & Company, K.G., Hamburg, Germany. A distributor 10 indicates a conventional feed mechanism which showers cut tobacco onto a horizontal belt 12 passing under a first drum 14 having a peripheral groove (not shown).

The tobacco stream on belt 12 is pressed into the groove in drum 14 and retained therein by partial vacuum, supplied through the hollow interior of the drum as hereinafter described. The tobacco borne by drum 14 which will be referred to herein as the tobacco sliver is carried over the drum and under a rotating equalizer knife 16. The knife 16 cuts off the portion of the tobacco silver extending above the knife position. The remaining tobacco 18, which will be referred to herein as the tobacco rod, is then transferred to the usual traveling paper web 20 and carried thereon by the usual tube belt 22 into the rod former 24 which forms the cigarette rod 26.

The excess tobacco 28 severed from the drum 14 by the knife 16, includes the bunches and irregularities in the tobacco sliver carried over drum 14 and is received by a second carded drum 30 rotating in the same direction as drum 14 but at a different speed. A picker roller 32 coacting with drum 30 removes the tobacco 28 therefrom, and the same is forthwith returned to belt 12 to merge with the tobacco supplied from the distributor 10.

The equalizer knife 16 is adjustable through a distance of about one millimeter toward and away from the drum 14 through a lever system 34 including a cam 36 and follower 38. The position of the cam 36 is continuously readjusted by a measuring and feedback control system comprising a suitable gauge transducer 40 responsive to the weight per unit length of the rod 26, an amplifier-controller device 42, 44, and a servo motor 46 and gear box 48 for driving the cam 36. The gauge-controller system 40, 48 is preferably of the type described in the copending application of Philip Spergel and Sidney A. Radley, Serial No. 641,414, filed February 20, 1957, now Patent No. 2,955,206. The gauge transducer 40 preferably comprises a radiation source 40a and a radiation detector 40b in an arrangement somewhat as described in the copending application of Sidney A. Radley and Philip Spergel, Serial No. 641,357, filed February 20, 1957, now Patent No. 2,954,775. As is set forth in said Serial No. 641,414, the control system employs a tachometer 46a coupled to or integral with the servo motor and forming part of an internal feedback loop whereby the control system functions as a special analog device for computing the time integral of the error in weight per unit length of the cigarette rod 26 and repositioning the cam 36 in accordance with the value of said integral.

Further in accordance with the invention there is provided means for measuring the return flow of excess tobacco 28 around the drum 30. In one preferred form of the invention, as illustrated, a dielectric gauge is employed for this measurement. This gauge includes a curved capacitor plate 50 spaced from the carded drum 30 and connected through a cable 52 to suitable capacitance measuring circuits 54. The capacitance measuring system 54 may be any of several types well known in the art which are adapted to provide a suitable signal to a controller 56. The controller 56 includes circuits for actuating a motor 58 which is connected through a gear box 60 and suitable mechanical drive arrangement represented by the dotted line 62 to the control shaft 64 of the distributor mechanism 10. The distributor 10 is driven by a variable speed mechanism in a manner similar to that which is described and illustrated in the above-referenced application Serial No. 641,357, the angular position of shaft 64 thereby determining the rate at which the distributor deposits tobacco on belt 12. The controller 56 may be of the same type as the controller 44, in which case the motor 58 is equipped with a tachometer 58a. Alternately, the controller 56 may be of the type which is illustrated in FIG. 2 of Patent No. 2,895,888, in which case the tachometer 58a is omitted.

In order to visualize the operation of the knife control, first assume that an optimum stream of tobacco is flowing on belt 12, that the knife 16 is in, say, the center of its positional range and that the cigarette rod 26 has the correct weight per unit length. Under these conditions no action is taken by the control system. Now if for some reason the cigarette rod 26 becomes light, say, the controller 44 will raise the knife 16, allowing more tobacco to pass into the rod former 24 but returning less tobacco around the drum 30 to belt 12. It is apparent that the return flow 28 of tobacco constitutes a small reservoir which can be manipulated by the equalizer knife control so as to eliminate medium or short-term variations in the tobacco rod 18.

If it is the case that the light condition of the cigarette rod 26 results from an insufficiency in the mean flow of tobacco on belt 12, the knife control action becomes regenerative. That is, the raising of the knife results in less return flow 28, which in turn decreases the amount of tobacco carried by drum 14, requiring a further raising of knife 16 by the controller, still further decreasing the return flow 28, and so on.

If this situation were to continue, the tobacco sliver on drum 14 would soon become so sparse that the irregularities could not be effectively removed by knife 16, which would only skim off the tops of the lumps and bunches therein, resulting in the production of cigarettes having excessive weight variance.

An opposite sequence of operation occurs in the event that the stream of tobacco from the distributor is excessive, eventually resulting in choking of the return flow system.

It is now apparent that the regenerative behavior of the knife control device, in maintaining constant the mean weight of the cigarette rod when an improper tobacco feed rate obtains, is reflected in the return flow (i.e. the level in the reservoir) of tobacco around drum 30. That is to say, a relatively slight but persistent error in the rate of feed is manifested as a relatively large variation in the return flow 28, the feed rate variation being virtually amplified in the return flow variation by the action of the knife control system.

A third control loop is arranged to control the partial vacuum within drum 14 which is effective to control the density of the tobacco sliver in the trough at the periphery of the drum 14. The peripheral trough on the drum 14 may have a perforate bottom wall in communication with the interior of the drum thereby to permit the partial vacuum within the drum to be effective to produce a variable amount of suction on the sliver thereby varying its density. For this purpose a vacuum line 66 is provided in communication with the interior of the drum 14 with the partial vacuum in the line 66 controlled by a vacuum control device 68. Control of the device 68 is effected by means of a suitable controller 70 which operates from an input signal derived from a potentiometer 72 which is positioned in accordance with the position of the shaft which turns the cam 36. Thus the adjusted position of the knife 16 as determined by the cam 36 is effective to supply a corresponding analog signal from the potentiometer 72 to the controller 70 and hence provide a corresponding control of the degree of vacuum maintained within the drum 14 by the vacuum controller 68.

The third control loop for controlling the density of the tobacco in the trough of wheel 14 acts to maintain the knife 16 within its proper operating range and permits the machine to operate satisfactorily with tobacco supplies of different densities. The cigarette making process may be carried on completely automatically for long periods of time.

An alternative arrangement for controlling the vacuum control 68 is provided in FIG. 2 by controller 74 which operates directly from the signal from amplifier 42 representative of the weight of the cigarette rod 26. This signal may be selected by changing switch 76 to contact 78 thereby providing for control of both knife position and the vacuum directly from the measurement of the cigarette rod 26 in accordance with the transfer functions effective in the two control loops. This arrangement may be made effectively the equivalent of the arrangement previously described utilizing potentiometer 72 and controller 70 by correlating the transfer functions obtained from controller 44 for the control of knife 16 and from controller 74 for the control of the vacuum in drum 14.

Certain dual control loops of the present invention may be utilized in particular applications. For example control of the volumetric flow and the density of the material may be adequate in applications where the gross mass flow can be maintained at a satisfactory level without automatic control. In some systems such as for example, where the volumetric flow is not automatically controlled as herein disclosed, the automatic control of the density of the material and the average gross mass flow may be adequate. These subcombinations will have utility in various applications which will be apparent to those skilled in the art.

The present invention will be understood to have a wide field of application which is not limited to the specific embodiments herein disclosed. Accordingly the invention is to be limited only by the scope of the appended claims.

I claim:

1. A control system for an industrial product making machine in which the weight per unit of the finished product is controlled comprising means for feeding material to said machine for producing said product, means for controlling the rate of feeding said material, means for controlling the density of the material received from the feeding means, volumetric control means for separating the material received from the density controlling means into two portions, means for passing one of said portions to produce said product, means for passing the other of said portions to be combined with the material input to said density controlling means, a fast acting control loop responsive to the weight of said product for controlling said volumetric control means to maintain desired product weight, a second control loop responsive to the average weight of said other portion for controlling said rate of feeding material, and a third control loop responsive to the adjustment of said volumetric control means for controlling said density controlling means.

2. A control system for an industrial product making machine in which the weight per unit of the finished product is controlled comprising means for feeding material to said machine for producing said product, means for controlling the rate of feeding said material, means for controlling the density of the material received from the feeding means, volumetric control means for separating the material received from the density controlling means into two portions, means for passing one of said portions to produce said product, means for passing the other of said portions to be combined with the material input to said density controlling means, a fast acting control loop responsive to the weight of said product for controlling said volumetric control means to maintain desired product weight, and a second control loop responsive to the adjustment of said volumetric control means for controlling said density controlling means.

3. A control system for an industrial product making machine in which the weight per unit of the finished product is controlled comprising means for feeding material to said machine for producing said product, means for controlling the rate of feeding said material, means for controlling the density of the material received from the feeding means, volumetric control means for separating the material received from the density controlling means into two portions, means for passing one of said portions to produce said product, means for passing the other of said portions to be combined with the material input to said density controlling means, means for adjusting said volumetric control means to vary the relative size of said two portions, a control loop responsive to the adjustment of said volumetric control means for controlling said density controlling means, and another control loop responsive to the average weight of said other portion for controlling said rate of feeding material.

4. A control system for an industrial product making machine in which the weight per unit of the finished product is controlled comprising means for feeding material to said machine for producing said product, means for controlling the rate of feeding said material, means for controlling the density of the material received from the feeding means, volumetric control means for separating the material received from the density controlling means into two portions, means for passing one of said portions to produce said product, means for passing the other of said portions to be combined with the material input to said density controlling means, a fast acting control loop responsive to the weight of said product for controlling said volumetric control means to maintain desired product weight, a second control loop responsive to the average weight of said other portion for controlling said rate of feeding material, and a third control loop responsive to the weight of said product for controlling said density controlling means.

5. In an industrial product making machine in which the average material input flow is equal to the average material output flow in the output product and in which control of said output flow is effected by a recirculating flow derived by a volumetric separation of the total flow to produce said output flow and said recirculating flow, a control system comprising means for gauging said output flow and controlling said volumetric separation to maintain said output flow at a predetermined value, and means for controlling the density of said total flow in accordance with the adjustment of said volumetric separation.

6. Apparatus according to claim 5 in which means are further provided wherein said average material input flow is controlled in accordance with the time integral of said recirculating flow relative to a selectable desired recirculating flow.

7. In an industrial product making machine in which the average material input flow is equal to the average material output flow in the output product and in which control of said output flow is effected by a recirculating flow derived by a volumetric separation of the total flow to produce said output flow and said recirculating flow, a control system comprising means for obtaining a signal which varies in accordance with the rapid fluctuations of the mass per unit length of said product by measuring said output flow immediately after said volumetric separation, means for controlling said volumetric separation in accordance with said signal and with a response which is adequate to reduce said rapid fluctuations, and means for controlling the density of said total flow in accordance with the time average of the controlled relative value of said volumetric separation with respect to a selected value for said separation.

8. Apparatus according in claim 7 in which a reservoir is positioned in the path of said recirculating flow and wherein means are further provided wherein the average material input flow is controlled in accordance with the level in said reservoir.

9. A continuous cigarette rod making machine comprising distributor means for forming and feeding a stream of cut tobacco, a cigarette rod forming mechanism, a tobacco reservoir for adding tobacco to said stream to form a tobacco sliver, means for trimming said tobacco sliver to supply only a portion thereof to said cigarette rod forming mechanism, means for returning the remainder of said tobacco to said reservoir, a high speed control loop responsive to rapid variations in the mass of said portion for controlling the trimming means to reduce said variations, means for sensing the tobacco level in said reservoir, means responsive to the sensed level of tobacco in said reservoir for controlling the average mass flow in said stream from said distributor, and means for varying the density of said tobacco sliver in accordance with the controlled position of said trimming means.

10. In a continuous cigarette rod forming machine in which a tobacco stream is formed with an average weight equal to the average cigarette rod weight and in which control of said cigarette rod weight is effected by a recirculating flow of tobacco derived by trimming a total flow to produce said rod and returning the tobacco trimmed from said rod to be combined with said stream to produce said total flow, a control system comprising means for gauging the mass per unit length of said cigarette rod and adjusting the trimming of said total flow to maintain said mass substantially constant, and means for controlling the density of said total flow in accordance with the adjustment of said trimming to maintain the trimming device within a normal operating range.

11. Apparatus according to claim 10 in which means are further provided wherein said tobacco stream is formed and controlled in accordance with a quantity related to the amount of tobacco in said recirculating flow to maintain said recirculating flow substantially constant.

12. A control system for a tobacco rod former in which the weight per unit length of the rod is controlled comprising means for forming and feeding forwardly a tobacco stream, means for controlling the rate of feeding tobacco to said stream, means for controlling the density of tobacco received from said stream, means for trimming the tobacco received from the density controlling means into two portions, means for passing one of said portions to produce said rod, means for passing the other of said portions to be combined with the tobacco stream at the input to said density controlling means, means for adjusting the trimming means to vary the relative size of said two portions, a control loop responsive to the adjustment of said trimming means for controlling said density controlling means, and another control loop responsive to the average quantity of tobacco in said other portion for controlling said rate of feeding tobacco to said stream.

13. Apparatus according to claim 12 further including a high speed controller responsive to the quantity of tobacco in said one portion for controlling said means for adjusting the trimming means.

References Cited in the file of this patent

UNITED STATES PATENTS

| | | |
|---|---|---|
| 1,878,109 | Clark | Sept. 20, 1932 |
| 2,660,178 | Rault | Nov. 24, 1953 |
| 2,938,521 | Lanore | May 31, 1960 |

FOREIGN PATENTS

| | | |
|---|---|---|
| 217,773 | Australia | Oct. 17, 1958 |